(12) United States Patent
Armstrong et al.

(10) Patent No.: US 11,073,019 B2
(45) Date of Patent: Jul. 27, 2021

(54) METALLIC SHAFT

(71) Applicant: ROLLS-ROYCE plc, London (GB)

(72) Inventors: Gareth M Armstrong, Nottingham (GB); Michael P Keenan, Sheffield (GB)

(73) Assignee: ROLLS-ROYCE plc, London (GB)

( * ) Notice: Subject to any disclaimer, the term of this patent is extended or adjusted under 35 U.S.C. 154(b) by 2 days.

(21) Appl. No.: 16/743,311

(22) Filed: Jan. 15, 2020

(65) Prior Publication Data

US 2020/0248555 A1 Aug. 6, 2020

(30) Foreign Application Priority Data

Feb. 5, 2019 (GB) ...................................... 1901557

(51) Int. Cl.
*F01D 5/02* (2006.01)
(52) U.S. Cl.
CPC ........ *F01D 5/025* (2013.01); *F05D 2240/242* (2013.01)
(58) Field of Classification Search
CPC . F01D 5/025; F01D 5/066; F01D 5/28; F01D 5/026; F05D 2240/242; F05D 2300/176; F05D 2230/232; F05D 2230/90; F05D 2300/00; F05D 2300/171; F05D 2230/23; Y02T 50/60
See application file for complete search history.

(56) References Cited

U.S. PATENT DOCUMENTS

| | | | |
|---|---|---|---|
| 2002/0136659 A1 | 9/2002 | Staubli et al. | |
| 2007/0012047 A1* | 1/2007 | Sasu | F01D 5/28 60/791 |
| 2008/0060362 A1 | 3/2008 | Poccia et al. | |
| 2011/0052401 A1 | 3/2011 | Scarlin et al. | |
| 2011/0100961 A1 | 5/2011 | Kilroy, Jr. | |

(Continued)

FOREIGN PATENT DOCUMENTS

| | | |
|---|---|---|
| EP | 2025866 A | 2/2009 |
| EP | 2030717 A1 | 3/2009 |

(Continued)

OTHER PUBLICATIONS

May 20, 2020 Extended European Search Report issued in European Patent Application No. 20151673.9.

(Continued)

*Primary Examiner* — Jacob M Amick
*Assistant Examiner* — Charles J Brauch
(74) *Attorney, Agent, or Firm* — Oliff PLC (57) ABSTRACT

The present disclosure relates to a metallic shaft for connecting components of a gas turbine engine. Example embodiments include a metallic shaft (400) for connecting components of a gas turbine engine, the shaft (400) having a longitudinal axis (410) and comprising: a first section (401) extending from a first end (403) of the shaft (400) to a joint (405), the first section (401) composed of a material having a first thermal expansion coefficient along the longitudinal axis (410); a second section (402) extending from a second opposing end (404) of the shaft to the joint (405), the second section (402) composed of a material having a second thermal expansion coefficient along the longitudinal axis (410) that is different to the first thermal expansion coefficient.

16 Claims, 5 Drawing Sheets

(56) References Cited

U.S. PATENT DOCUMENTS

| | | | |
|---|---|---|---|
| 2013/0309087 A1 | 11/2013 | Watson | |
| 2014/0191597 A1* | 7/2014 | Pal | H02K 9/08 |
| | | | 310/62 |
| 2015/0292401 A1 | 10/2015 | Unton | |
| 2015/0338005 A1* | 11/2015 | Davis | F01D 9/065 |
| | | | 285/305 |
| 2016/0010481 A1* | 1/2016 | Gurao | F01D 5/025 |
| | | | 415/134 |
| 2017/0145859 A1 | 5/2017 | Mariano et al. | |
| 2018/0216524 A1* | 8/2018 | Lineton | C23C 28/32 |

FOREIGN PATENT DOCUMENTS

| | | | | |
|---|---|---|---|---|
| FR | 2553843 A1 * | 4/1985 | | F16D 1/033 |
| WO | 2014/149126 A2 | 9/2014 | | |

OTHER PUBLICATIONS

Jul. 19, 2019 Combined Search and Examination Report issued in Great Britain Application 1901557.7.

* cited by examiner

METALLIC SHAFT

CROSS-REFERENCE TO RELATED APPLICATIONS

This specification is based upon and claims the benefit of priority from UK Patent Application Number 1901557.7 filed on Feb. 5, 2019, the entire contents of which are incorporated herein by reference.

BACKGROUND

1. Field of the Disclosure

The present disclosure relates to a metallic shaft for connecting components of a gas turbine engine.

2. Description of the Related Art

Metallic shafts, which may be solid or hollow (i.e. tubular), are used for various purposes in gas turbine engines, for example to mount or connect rotating components or to transport fluids such as air, oil, or mixtures thereof, between components. A particular problem is where the shaft and associated components are required to operate at high temperatures. For steel components, such operating temperatures may be from ambient temperatures up to around 400° C., whereas for titanium and nickel alloy components the operating temperatures may be higher. Thermal expansion of the various components in a gas turbine engine therefore needs to be taken into account to manage internal stresses that may arise during operation.

SUMMARY

According to a first aspect there is provided a metallic shaft for connecting components of a gas turbine engine, the shaft having a longitudinal axis and comprising:
 a first section extending from a first end of the shaft to a joint, the first section composed of a material having a first thermal expansion coefficient along the longitudinal axis;
 a second section extending from a second opposing end of the shaft to the joint, the second section composed of a material having a second thermal expansion coefficient along the longitudinal axis that is different to the first thermal expansion coefficient.

An advantage of the shaft being made of at least two sections of differing thermal expansion coefficients is that the overall thermal expansion coefficient of the shaft can be designed to closely match that of the components the shaft is designed to connect between, or can be designed to differ from that of such components, for example to apply a compressive load therebetween.

The joint connecting the two sections of the shaft may be a welded or bonded joint or a bolted joint. A bonded joint may be formed by diffusion bonding the two sections together. The bolted joint may for example comprise a flanged portion on each of the first and second sections joined together by a plurality of bolts.

A thermal barrier coating may be provided over a portion of an outer surface of the first and/or second section. The thermal barrier coating serves to slow the rate at which the portion of the section heats up and cools down, allowing the shaft to be less sensitive to temperature changes.

One or more heat dissipating fins may be provided extending from a portion of an outer surface of the first and/or second section, which serves to speed up the rate at which the portion of the section heats up and cools down, allowing the shaft to be more sensitive and responsive to temperature changes.

The shaft may be tubular or solid. Where the shaft is tubular, the shaft comprises a lumen extending through the shaft from the first end to the second end. A tubular shaft may be used for example as a passage through which air and/or oil may travel between components of the gas turbine engine.

The first section may be composed of a titanium-based alloy, while the second section may be composed of a nickel-based alloy. A titanium-based alloy may be defined as an alloy whose primary constituent is titanium. A nickel-based alloy may be similarly defined.

The first section may have a length that is between 5% and 95% of a length of the metallic shaft, with the second section taking up the remaining length of the metallic shaft. The length of the first section may for example be 10%, 20%, 30%, 40%, 50%, 60%, 70%, 80% or 90%+/−5% of the length of the metallic shaft.

In accordance with a second aspect there is provided a rotor assembly for a gas turbine engine, the rotor assembly comprising a plurality of discs and a central metallic shaft having a longitudinal axis and comprising:
 a first section extending from a first end of the shaft to a joint, the first section composed of a material having a first thermal expansion coefficient along the longitudinal axis;
 a second section extending from a second opposing end of the shaft to the joint, the second section composed of a material having a second thermal expansion coefficient along the longitudinal axis that is different to the first thermal expansion coefficient,
the plurality of discs mounted between the first and second ends of the shaft.

An advantage of this arrangement is that the overall thermal expansion coefficient along the length of the shaft can be selected so that a compressive force is applied between the discs over a temperature range of operation. The central shaft may therefore be configured to provide a clamping force between the plurality of discs over an operational temperature range of the rotor assembly. The operational temperature range may for example be within a range of from 0 to 800° C. for the plurality of discs.

A thermal expansion of the metallic shaft in the direction of the longitudinal axis may be between 15% and 30% less than a thermal expansion of the plurality of discs in the direction of the longitudinal axis when the rotor assembly is operating at a maximum operational temperature.

Alternatively, the overall thermal expansion coefficient along the length of the shaft can be selected to closely match that of the plurality of discs to avoid high mechanical loads.

The joint connecting the two sections of the shaft may be a welded or bonded joint or a bolted joint. A bonded joint may be formed by diffusion bonding the two sections together. The bolted joint may for example comprise a flanged portion on each of the first and second sections joined together by a plurality of bolts.

A thermal barrier coating may be provided over a portion of an outer surface of the first and/or second section. The thermal barrier coating serves to slow the rate at which the portion of the section heats up and cools down, allowing the shaft to be less sensitive to temperature changes.

One or more heat dissipating fins may be provided extending from a portion of an outer surface of the first and/or second section, which serves to speed up the rate at which the portion of the section heats up and cools down, allowing the shaft to be more sensitive and responsive to temperature changes.

The first section may be composed of a titanium-based alloy, while the second section may be composed of a nickel-based alloy. A titanium-based alloy may be defined as an alloy whose primary constituent is titanium. A nickel-based alloy may be similarly defined.

The first section may have a length that is between 5% and 95% of a length of the metallic shaft, with the second section taking up the remaining length of the metallic shaft. The length of the first section may for example be 10%, 20%, 30%, 40%, 50%, 60%, 70%, 80% or 90%+/−5% of the length of the metallic shaft.

In an embodiment, the discs are joined together by a plurality of bolts, each bolt comprising a metallic shaft having a longitudinal axis and comprising:
  a first section extending from a first end of the shaft to a joint, the first section composed of a material having a first thermal expansion coefficient along the longitudinal axis;
  a second section extending from a second opposing end of the shaft to the joint, the second section composed of a material having a second thermal expansion coefficient along the longitudinal axis that is different to the first thermal expansion coefficient.

There is further provided a rotor assembly for a gas turbine engine, the rotor assembly comprising a plurality of discs joined together by a plurality of bolts, each bolt comprising a central metallic shaft having a longitudinal axis and comprising:
  a first section extending from a first end of the shaft to a joint, the first section composed of a material having a first thermal expansion coefficient along the longitudinal axis;
  a second section extending from a second opposing end of the shaft to the joint, the second section composed of a material having a second thermal expansion coefficient along the longitudinal axis that is different to the first thermal expansion coefficient.

In accordance with a third aspect there is provided a gas turbine engine for an aircraft comprising a tubular component arranged to transport air and/or oil between components of the engine, the tubular component comprising a metallic shaft having a longitudinal axis and comprising:
  a first section extending from a first end of the shaft to a joint, the first section composed of a material having a first thermal expansion coefficient along the longitudinal axis;
  a second section extending from a second opposing end of the shaft to the joint, the second section composed of a material having a second thermal expansion coefficient along the longitudinal axis that is different to the first thermal expansion coefficient,
wherein the shaft is tubular.

In accordance with a fourth aspect there is provided a gas turbine engine for an aircraft comprising:
  an engine core comprising a turbine, a compressor, and a core shaft connecting the turbine to the compressor;
  a fan located upstream of the engine core, the fan comprising a plurality of fan blades; and
  a gearbox that receives an input from the core shaft and outputs drive to the fan so as to drive the fan at a lower rotational speed than the core shaft,
  wherein the engine core comprises a rotor assembly comprising a plurality of discs and a central metallic shaft having a longitudinal axis and comprising:
    a first section extending from a first end of the shaft to a joint, the first section composed of a material having a first thermal expansion coefficient along the longitudinal axis;
    a second section extending from a second opposing end of the shaft to the joint, the second section composed of a material having a second thermal expansion coefficient along the longitudinal axis that is different to the first thermal expansion coefficient,
the plurality of discs mounted between the first and second ends of the shaft.

Where the turbine is a first turbine, the compressor a first compressor and the core shaft a first core shaft, the engine core may further comprise a second turbine, a second compressor and a second core shaft connecting the second turbine to the second compressor, the second turbine, second compressor, and second core shaft being arranged to rotate at a higher rotational speed than the first core shaft.

In an embodiment, the turbine, for example the first turbine, may comprise the rotor assembly of the second aspect. The core shaft may comprise the shaft of the first aspect.

In an embodiment, the rotor assembly of the second aspect may be part of the compressor.

In an embodiment, the longitudinal axis of the shaft of the rotor assembly may coincide with a principal rotational axis of the gas turbine engine.

In an embodiment, the central metallic shaft may be tubular, having a lumen extending through the shaft from the first end to the second end to transport air and/or oil between components of the engine.

In accordance with a fifth aspect there is provided a method of designing a metallic shaft for connecting components of a gas turbine engine, the method comprising:
  determining a thermal expansion of the components;
  selecting a first section of the shaft composed of a material having a first thermal expansion coefficient and a first length; and
  selecting a second section of the shaft composed of a material having a second thermal expansion coefficient and a second length,
  wherein the first and second lengths and the first and second thermal expansion coefficients are selected such that, when the first and second sections are joined to form the metallic shaft, an overall thermal expansion coefficient of the metallic shaft in the direction of a longitudinal axis of the metallic shaft is between 15% and 30% less than a thermal expansion of the components in the direction of the longitudinal axis at a maximum operational temperature of the components to provide a clamping force between the components over an operational temperature range.

The operational temperature range may for example be within a range of from 0 to 800° C.

Other features of the first aspect may also apply to the fifth aspect.

In accordance with a sixth aspect there is provided a method of manufacturing a metallic shaft for connecting components of a gas turbine engine, the method comprising:
  selecting a first section of the shaft composed of a material having a first thermal expansion coefficient and a first length;
  selecting a second section of the shaft composed of a material having a second thermal expansion coefficient different to the first thermal expansion coefficient and a second length; and joining the first and second sections with a joint to form the metallic shaft having a longitudinal axis with the first section extending from a first end of the shaft to the joint and the second section extending from a second opposing end of the shaft to the joint.

Other features of the first aspect may also apply to the sixth aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm, or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$'s, 105 $Nkg^{-1}$'s, 100 $Nkg^{-1}$'s, 95 $Nkg^{-1}$'s, 90 $Nkg^{-1}$'s, 85 $Nkg^{-1}$'s or 80 $Nkg^{-1}$'s. The specific thrust may be in an inclusive range bounded by any two of the values in the previous sentence (i.e. the values may form upper or lower bounds), for example in the range of from 80 $Nkg^{-1}$'s to 100 $Nkg^{-1}$'s, or 85 $Nkg^{-1}$'s to 95 $Nkg^{-1}$'s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft)

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
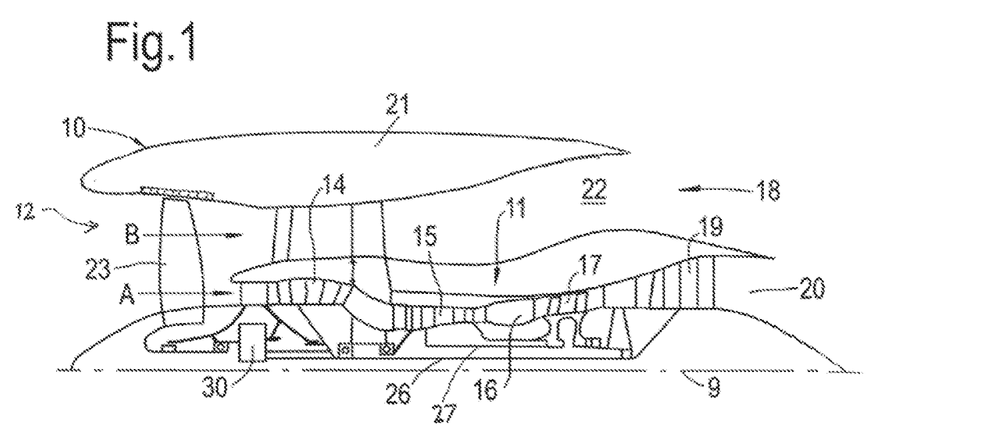
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
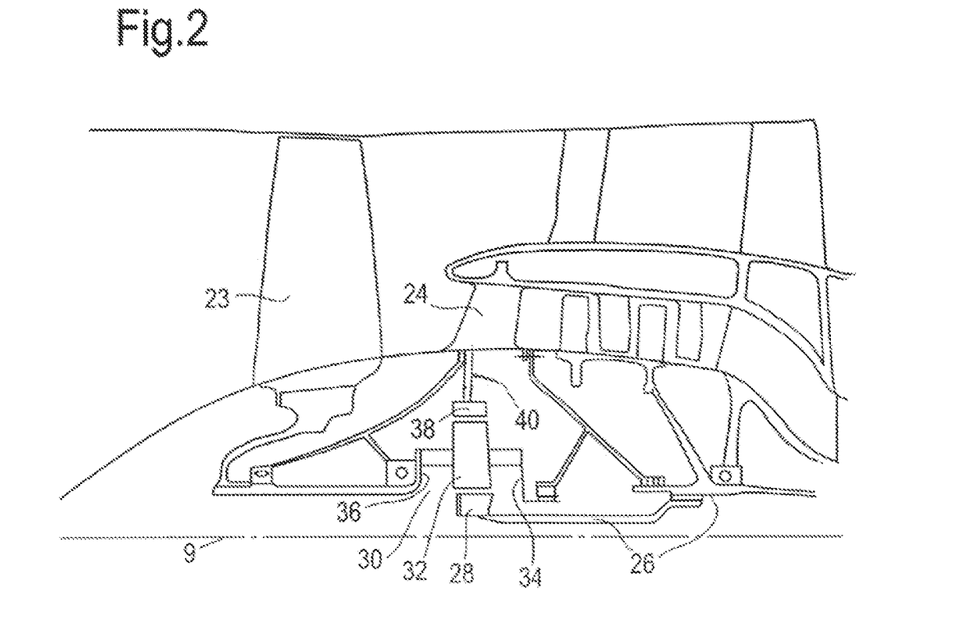
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
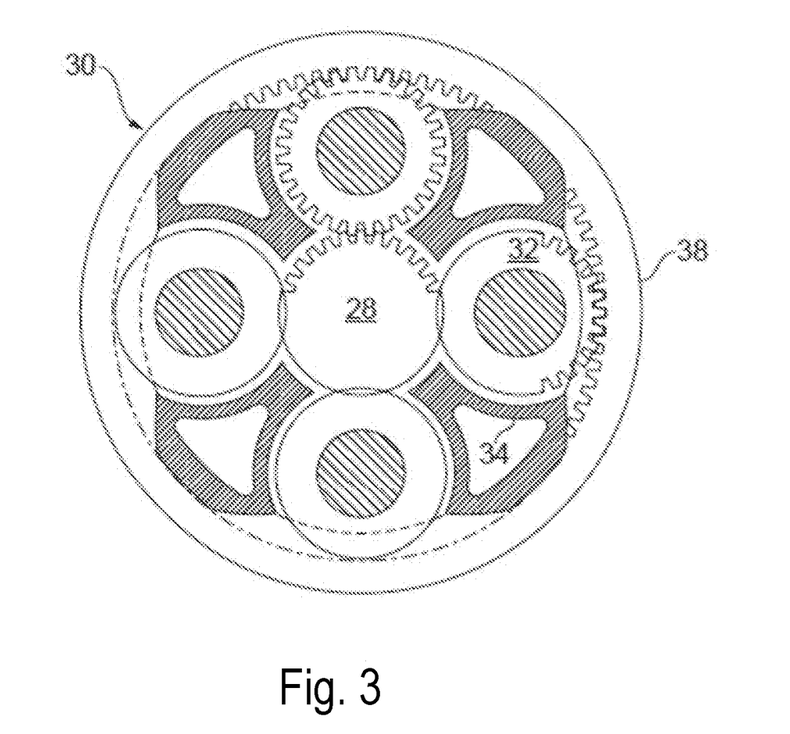
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20, meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
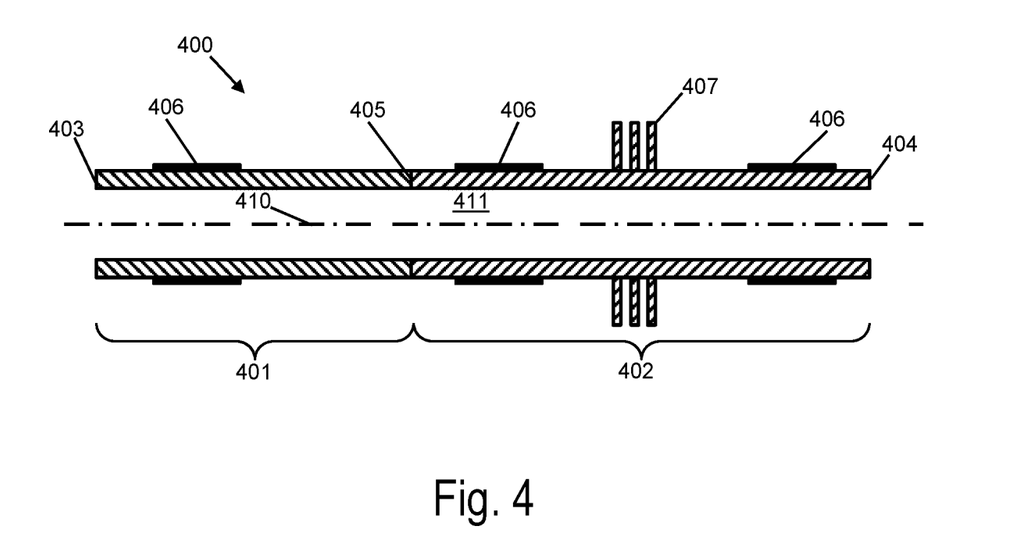
FIG. 4 is a schematic cross-section of an example shaft.
Figure 5:
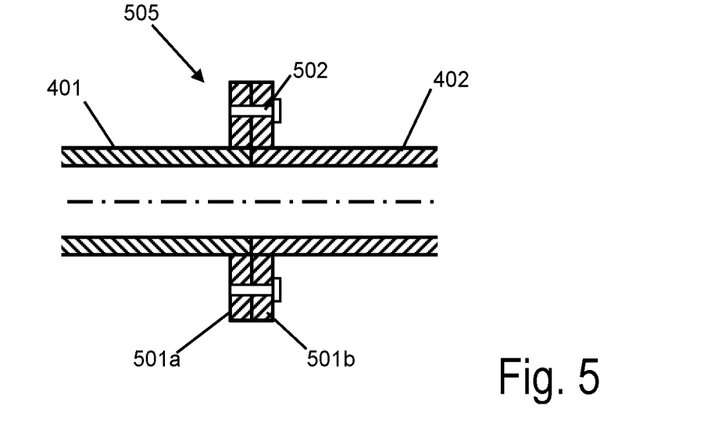
FIG. 5 is a schematic cross-section of an alternative joint for the shaft of FIG. 4.

FIG. 4 illustrates an example metallic shaft 400 for connecting components of a gas turbine engine, such as the types described above. The shaft 400 extends along a longitudinal axis 410 and comprises a first section 401 and a second section 402. The first and second sections 401, 402 are joined together by a joint 405 between first and second ends 403, 404 of the shaft 400. The joint may for example be a welded joint as in FIG. 4. In alternative examples the joint may be a bolted joint as shown in FIG. 5, in which the joint 505 comprises a flanged portion 501a, 501b on each of the first and second sections 401, 402, the flanged portions 501a, 501b being joined together by a plurality of bolts 502 extending through the flanged portions 501a, 501b.

The first and second sections 401, 402 have respective different first and second thermal expansion coefficients in a direction along the longitudinal axis 410. The first thermal expansion coefficient may for example be smaller than the second thermal expansion coefficient, such that an overall expansion coefficient, i.e. a measure of a change in length, $\Delta L$, of the shaft 400 is an average of the first and second thermal expansion coefficients $\alpha_1$, $\alpha_2$ in combination with the lengths of the first and second sections, $L_1$, $L_2$. An average linear thermal expansion coefficient, $\alpha_{avg}$, can be calculated as:

$$\alpha_{avg} = \frac{\alpha_1 L_1 + \alpha_2 L_2}{L_1 + L_2}$$

An average thermal expansion coefficient can therefore be chosen according to the relative lengths of the first and second sections 401, 402. If, for example, the first section is made from a steel having a thermal expansion coefficient of $13 \times 10^{-6}$ $K^{-1}$ and the second section from a steel having a thermal expansion coefficient of $17 \times 10^{-6}$ $K^{-1}$, the average thermal expansion coefficient can be chosen to be anywhere between these two values depending on the relative lengths of the first and second sections. With the first and second sections equal in length, the average coefficient will be $15 \times 10^{-6}$ $K^{-1}$. Increasing the length of the second section relative to the first section will increase the average thermal expansion coefficient, and increasing the length of the first section relative to the second section will decrease the average thermal expansion coefficient. This example illustrates how two types of steel may be chosen such that an average thermal expansion coefficient can be chose to be equal to that of a nickel superalloy, which may have a thermal expansion coefficient of around $15 \times 10^{-6}$ $K^{-1}$. This can, for example, be advantageous when designing a shaft or bolt that is for joining together nickel superalloy parts, such as gas turbine discs and other components for use at high temperatures. Selecting the thermal expansion coefficient can allow the discs to be joined together mechanically with the shaft joining the discs together maintaining the discs in compression throughout the operational temperature range.

The shaft 400 may also comprise other features that affect the transient thermal behaviour of the shaft, which may either slow down or speed up temperature changes in selected portions of the shaft 400. When for example the shaft is used as a central drive shaft joining together multiple discs, different portions of the shaft 400 may be subjected to different rates of heating and cooling. To accommodate these different heating and cooling rates, a thermal barrier coating 406 may be applied to one or more portions of the outer surface of the first and/or second sections 401, 402. In the example shown in FIG. 4 three portions of the shaft 400 are provided with a thermal barrier coating 406, which may for example correspond to areas where hot gasses pass over the shaft 400. The thermal barrier coatings 406 may slow down the rate at which the underlying shaft 400 heats up, as well as slow down the rate at which the shaft 400 cools down. For other regions where a more rapid heating or cooling may be required, one or more heat dissipating fins 407 may be provided, extending from a portion of an outer surface of the first and/or second section 401, 402. Such fins 407 may for example be applied to a portion that would otherwise heat up or cool down more slowly than other portions. Together with the balanced thermal expansion coefficient, the use of thermal barrier coatings and/or fins may allow for a more uniform temperature change along the length of the shaft 400, allowing the length of the shaft 400 to be more closely matched to the components the shaft 400 is connected between.

In some embodiments the shaft may be tubular, for example where the shaft is arranged to transport air and/or oil between components of a gas turbine engine or in other cases where the shaft forms a drive shaft of the gas turbine engine. In other embodiments the shaft may be solid, for example where the shaft provides a bolt for connecting together discs of a rotor assembly.

Figure 6:
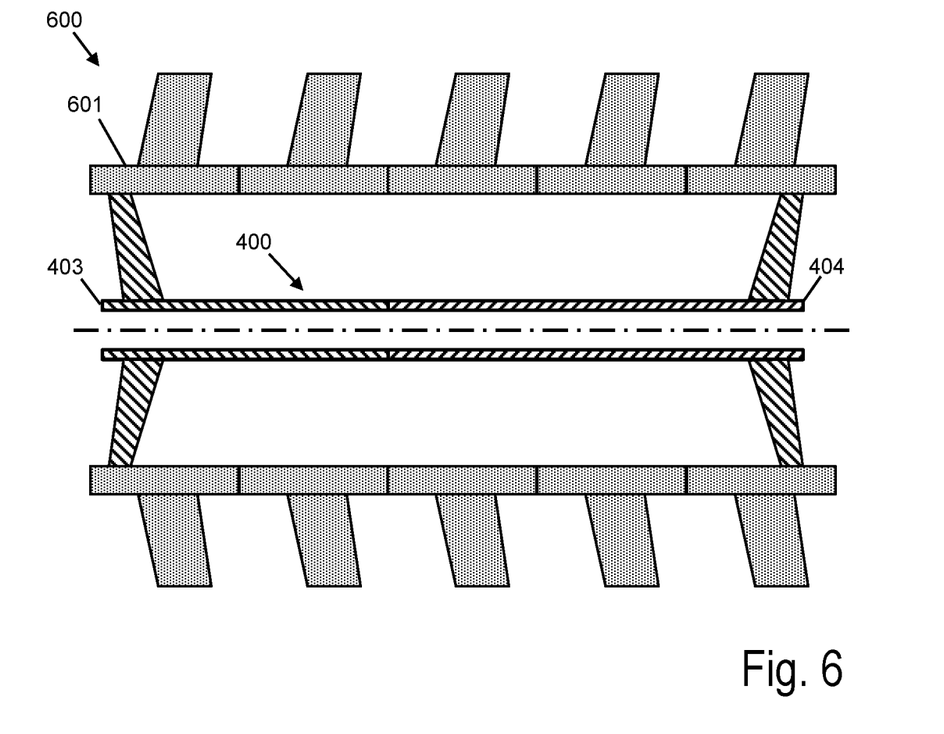
FIG. 6 is a schematic sectional view of a rotor assembly for a gas turbine engine with a metallic shaft connecting a plurality of discs.

FIG. 6 illustrates schematically a rotor assembly 600 for a gas turbine engine, in which a plurality of discs 601 is connected together with a shaft 400 of the type described above. The plurality of discs 601 is mounted between the first and second ends 403, 404 of the shaft. The shaft 400 provides a clamping force between the plurality of discs over an operational temperature range of the rotor assembly 600.

The discs 601 may be made from a range of suitable materials selected on the basis of maximum operating temperature, cost and weight. As a result, the materials used for each disc can vary as the maximum operational temperature increases from the front to the rear of the engine. The materials used may typically include a titanium alloy such as 6246 (Titanium 6Al-2Sn-4Zr-6Mo) for the front stages, and superalloys such as nickel-based alloys 718, 720Li or RR1000 for the middle and rear stages. When the engine is in a high power condition such as during take-off, the increase in temperature tends to cause the discs to expand in diameter and length relative to their size at room temperature. Any internal shaft will be exposed to lower temperatures and so would expand by a smaller amount.

As an example, for a given length and temperature distribution, an internal shaft made entirely of Nickel alloy 718 would have a thermal expansion of around 13% less than the thermal expansion of the assembly of discs. For the same conditions, an internal shaft made entirely from Titanium 6246 would have a thermal expansion around 40% less than the assembly of discs. If the internal shaft was partially made of Titanium 6246 and partially made of Nickel alloy 718 then the thermal expansion could be chosen to be between these limits. The exact value could be controlled by varying the proportion of the length which is made of each material. This would be useful if the shaft was intended to apply a compressive load along the axis of the compressor and the desirable level of compressive load required a level of thermal expansion between the above example values.

If an alternative material were available that could safely be used in the operating environment and had a rate of thermal expansion higher than the materials mentioned above, then it could be used in preference of either Titanium 6246 or Nickel alloy 718 to enable the expansion of the shaft to match that of the rotor assembly. This would be useful if the function of the internal shaft was not to apply a load but instead for example to provide a seal to prevent the leakage of oil and/or air.

Figure 7:
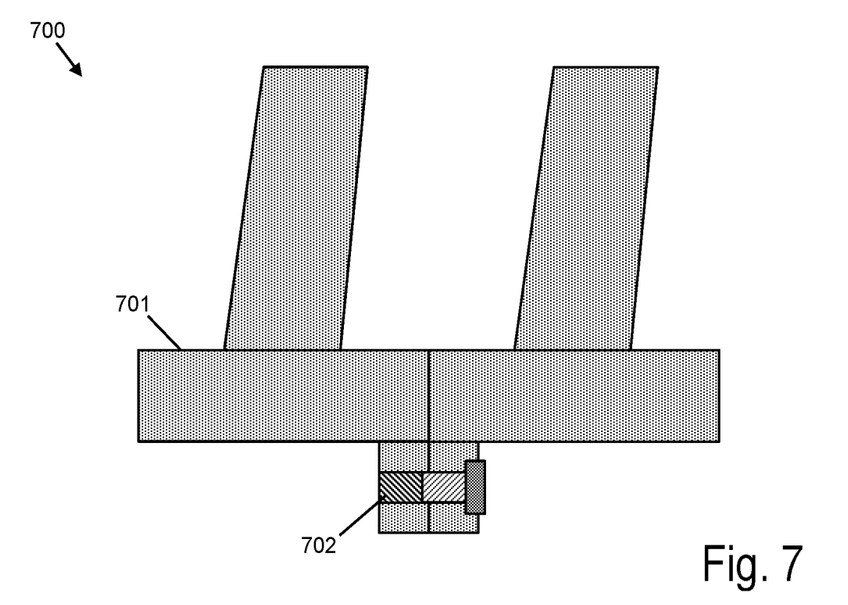
FIG. 7 is a schematic sectional view of a portion of a rotor assembly for a gas turbine engine with a metallic shaft connecting a plurality of discs.

FIG. 7 illustrates schematically another embodiment in which a rotor assembly 700 comprises a plurality of discs 701 joined together by a plurality of bolts 702, one of which is shown. Each bolt 702 comprises a metallic shaft of the type described above, the metallic shaft in this case being preferably solid.

Figure 8:
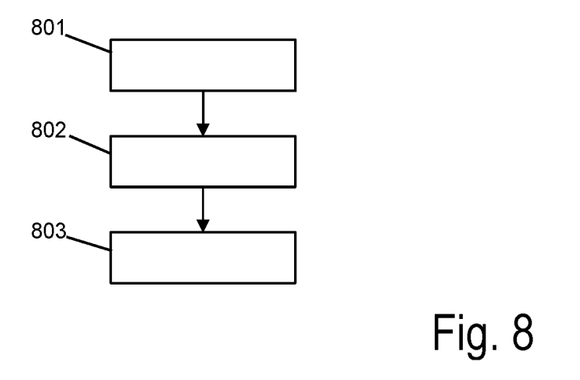
FIG. 8 is a flow chart illustrating a method of designing a metallic shaft.

FIG. 8 illustrates a method of designing a metallic shaft for connecting components of a gas turbine engine. In a first step 801, a thermal expansion coefficient of the components is determined. In a second step 802, a first section of the shaft is selected, composed of a material having a first thermal expansion coefficient and a first length. In a third step 803, a second section of the shaft is selected, composed of a material having a second thermal expansion coefficient different to the first thermal expansion coefficient and a second length. The first and second lengths and the first and second thermal expansion coefficients are selected such that, when the first and second sections are joined to form the metallic shaft, an overall thermal expansion coefficient of the metallic shaft matches the thermal expansion coefficient of the components over an operational temperature range.

Figure 9:
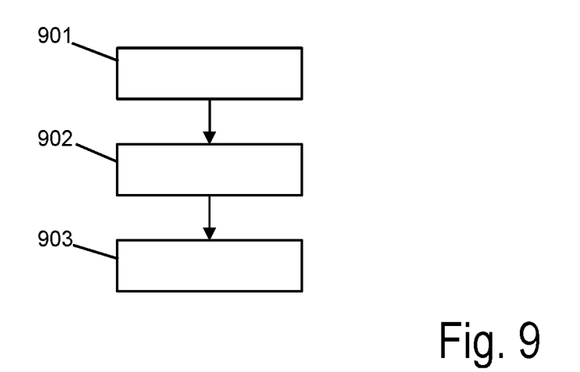
FIG. 9 is a flow chart illustrating a method of manufacturing a metallic shaft.

FIG. 9 illustrates a method of manufacturing a metallic shaft for connecting components of a gas turbine engine. In a first step 901, a first section of the shaft is selected composed of a material having a first thermal expansion coefficient and a first length. In a second step 902, a second section of the shaft is selected composed of a material having a second thermal expansion coefficient different to the first thermal expansion coefficient and a second length. In a third step 903, the first and second sections are joined with a joint to form the metallic shaft having a longitudinal axis with the first section extending from a first end of the shaft to the joint and the second section extending from a second opposing end of the shaft to the joint.

Figure 10:
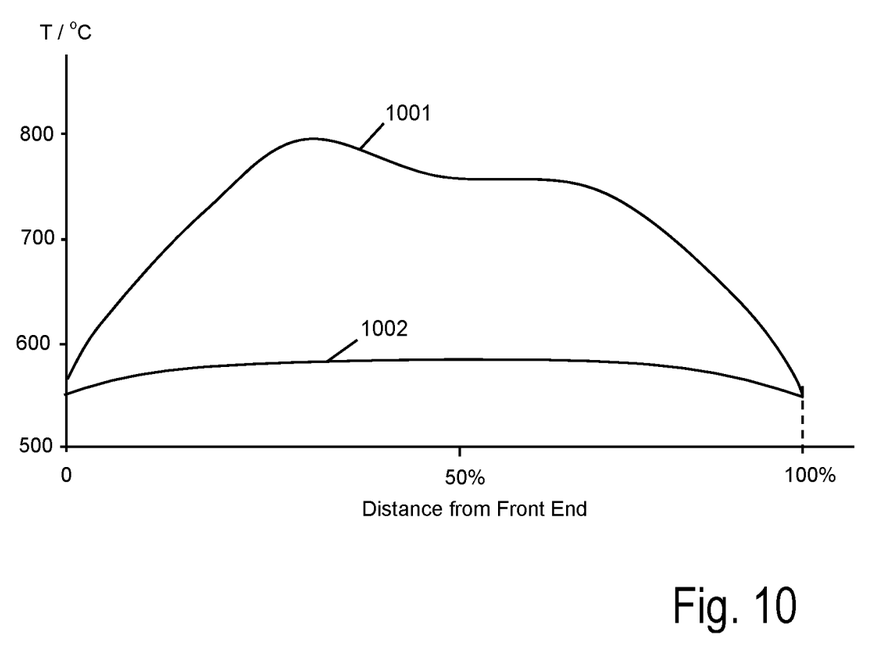
FIG. 10 is a schematic plot of temperature as a function of distance from a front end of an example rotor assembly.

FIG. 10 illustrates a schematic plot of temperature as a function of distance from the front end of a rotor assembly as a percentage of the total length of the rotor assembly. An example rotor assembly may be around 1 m in total length. As the distance from the front end increases, the temperature 1001 of the turbine discs increases, reaching a maximum of around 800° C. before gradually falling off towards the exit of the engine core. Over this temperature range the total length of the disc assembly may increase by around 0.5%. The temperature 1002 of the central shaft also increases, but less so than the discs due to being further removed from the hot gas flows through the engine core. The temperature 1002 of the central shaft may reach a maximum of around 580° C. before also falling off towards the exit of the engine core. With the central shaft constructed to have first and second sections as described herein, the thermal expansion of the central shaft may be less than the expansion of the discs when the engine is operational, resulting in a consistent compressive force being applied across the discs. Fewer bolted joints may therefore be required to hold the discs together, simplifying assembly and servicing of the rotor assembly, particularly for a reduced overall diameter of the rotor assembly.

It will be understood that the invention is not limited to the embodiments above-described and various modifications and improvements can be made without departing from the concepts described herein. For example, the shaft may comprise more than two sections, for example three or more sections.

Except where mutually exclusive, any of the features may be employed separately or in combination with any other features and the disclosure extends to and includes all combinations and sub-combinations of one or more features described herein.

The invention claimed is:

1. A rotor assembly for a gas turbine engine, the rotor assembly comprising a plurality of discs and a central metallic shaft having a longitudinal axis and comprising:
    a first section extending from a first end of the shaft to a joint, the first section composed of a material having a first thermal expansion coefficient along the longitudinal axis;
    a second section extending from a second opposing end of the shaft to the joint, the second section composed of a material having a second thermal expansion coefficient along the longitudinal axis that is different to the first thermal expansion coefficient,
the plurality of discs mounted between the first and second ends of the shaft; wherein
    the central metallic shaft is configured to provide a clamping force between the plurality of discs over an operational temperature range of the rotor assembly in that
        a first length of the first section,
        a second length of the second section, and
        the first and second thermal expansion coefficients are each selected such that, when the first and second sections are joined to form the central metallic shaft, an overall thermal expansion coefficient of central metallic shaft in the direction of a longitudinal axis of the central metallic shaft is between 15% and 30% less than a thermal expansion of the plurality of discs in the direction of the longitudinal axis at a maximum operational temperature to provide the clamping force between the plurality of discs over the operational temperature range of the rotor assembly.

2. The rotor assembly of claim 1 wherein the operational temperature range is within a range of from 0 to 800° C. for the plurality of discs.

3. The rotor assembly of claim 1 wherein the joint is a welded or bonded joint.

4. The rotor assembly of claim 1 wherein the joint comprises a flanged portion on each of the first and second sections joined together by a plurality of bolts.

5. The rotor assembly of claim 1 wherein a thermal barrier coating is provided over a portion of an outer surface of the first and/or second section.

6. The rotor assembly of claim 1 wherein one or more heat dissipating fins are provided extending from a portion of an outer surface of the first and/or second section.

7. The rotor assembly of claim 1 wherein the shaft is tubular, having a lumen extending through the shaft from the first end to the second end.

8. The rotor assembly of claim 1 wherein the first section is composed of a titanium-based alloy and the second section is composed of a nickel-based alloy.

9. The rotor assembly of claim 1 wherein the first section has a length that is between 5% and 95% of a length of the metallic shaft.

10. The rotor assembly of claim 1 wherein the discs are joined together by a plurality of bolts, each bolt comprising a metallic shaft having a longitudinal axis and comprising:
    a first section extending from a first end of the shaft to a joint, the first section composed of a material having a first thermal expansion coefficient along the longitudinal axis;
    a second section extending from a second opposing end of the shaft to the joint, the second section composed of a material having a second thermal expansion coefficient along the longitudinal axis that is different to the first thermal expansion coefficient.

11. A gas turbine engine for an aircraft comprising:
    an engine core comprising a turbine, a compressor, and a core shaft connecting the turbine to the compressor;
    a fan located upstream of the engine core, the fan comprising a plurality of fan blades; and
    a gearbox that receives an input from the core shaft and outputs drive to the fan so as to drive the fan at a lower rotational speed than the core shaft,
    wherein the engine core comprises a rotor assembly comprising a plurality of discs and a central metallic shaft having a longitudinal axis and comprising:
        a first section extending from a first end of the shaft to a joint, the first section composed of a material having a first thermal expansion coefficient along the longitudinal axis;
        a second section extending from a second opposing end of the shaft to the joint, the second section composed of a material having a second thermal expansion coefficient along the longitudinal axis that is different to the first thermal expansion coefficient, the plurality of discs mounted between the first and second ends of the shaft; wherein the central metallic shaft is configured to provide a clamping force between the plurality of discs over an operational temperature range of the rotor assembly in that a first length of the first section, a second length of the second section, and the first and second thermal expansion coefficients are each selected such that, when the first and second sections are joined to form the central metallic shaft, an overall thermal expansion coefficient of central metallic shaft in the direction of a longitudinal axis of the central metallic shaft is between 15% and 30% less than a thermal expansion of the plurality of discs in the direction of the longitudinal axis at a maximum operational temperature to provide the clamping force between the plurality of discs over the operational temperature range of the rotor assembly.

12. The gas turbine engine according to claim 11, wherein:

the turbine is a first turbine, the compressor is a first compressor, and the core shaft is a first core shaft;

the engine core further comprises a second turbine, a second compressor, and a second core shaft connecting the second turbine to the second compressor; and the second turbine, second compressor, and second core shaft are arranged to rotate at a higher rotational speed than the first core shaft.

13. The gas turbine engine according to claim 11, wherein the turbine comprises the rotor assembly.

14. The gas turbine engine according to claim 11, wherein the central metallic shaft is tubular, having a lumen extending through the shaft from the first end to the second end to transport air and/or oil between components of the engine.

15. A method of designing a metallic shaft for connecting components of a gas turbine engine, the method comprising:

determining a thermal expansion of the components;

selecting a first section of the shaft composed of a material having a first thermal expansion coefficient and a first length; and selecting a second section of the shaft composed of a material having a second thermal expansion coefficient different to the first thermal expansion coefficient and a second length, wherein the first and second lengths and the first and second thermal expansion coefficients are selected such that, when the first and second sections are joined to form the metallic shaft, an overall thermal expansion coefficient of the metallic shaft in the direction of a longitudinal axis of the metallic shaft is between 15% and 30% less than a thermal expansion of the components in the direction of the longitudinal axis at a maximum operational temperature of the components to provide a clamping force between the components over an operational temperature range.

16. The method of claim 15 wherein the operational temperature is within a range of from 0 to 800° C.

* * * * *